(12) United States Patent
Nelson

(10) Patent No.: US 8,727,424 B1
(45) Date of Patent: May 20, 2014

(54) INBED TRUCK SPOILER

(76) Inventor: Robert Stephen Nelson, Scottsdale, AZ (US)

(\*) Notice: Subject to any disclaimer, the term of this patent is extended or adjusted under 35 U.S.C. 154(b) by 0 days.

(21) Appl. No.: 13/539,047

(22) Filed: Jun. 29, 2012

Related U.S. Application Data

(63) Continuation-in-part of application No. 11/423,362, filed on Jun. 9, 2006, now abandoned.

(60) Provisional application No. 60/693,478, filed on Jun. 24, 2005.

(51) Int. Cl.
*B60J 9/00* (2006.01)

(52) U.S. Cl.
USPC .................................................. 296/180.1

(58) Field of Classification Search
USPC ............ 296/180.1, 218, 216.09, 180.5, 39.2, 296/57.1, 100.18, 37.6, 50; 36/118.9; 224/403, 404
See application file for complete search history.

(56) References Cited

U.S. PATENT DOCUMENTS

| | | | | |
|---|---|---|---|---|
| 4,451,075 A | * | 5/1984 | Canfield | 296/37.6 |
| 4,506,870 A | * | 3/1985 | Penn | 296/180.1 |
| 4,580,828 A | * | 4/1986 | Jones | 296/57.1 |
| 4,585,263 A | * | 4/1986 | Hesner | 296/180.1 |
| 4,884,838 A | * | 12/1989 | Slater | 296/180.1 |
| 4,938,398 A | * | 7/1990 | Hallsen | 224/404 |
| 5,069,498 A | * | 12/1991 | Benchoff | 296/180.1 |
| 5,083,829 A | * | 1/1992 | Fonseca | 296/37.6 |
| 5,236,242 A | * | 8/1993 | Seeman | 296/180.1 |
| 5,498,049 A | * | 3/1996 | Schlachter | 296/37.6 |
| 5,630,637 A | * | 5/1997 | Sauri | 296/56 |
| 5,645,310 A | * | 7/1997 | McLaughlin | 296/180.5 |
| 5,722,714 A | * | 3/1998 | Vallerand | 296/180.1 |
| 5,727,838 A | * | 3/1998 | Vallerand | 296/180.1 |
| 5,735,567 A | * | 4/1998 | Mora, Sr. | 296/180.1 |
| 5,743,589 A | * | 4/1998 | Felker | 296/180.5 |
| D410,427 S | * | 6/1999 | Kokones | D12/400 |
| 6,179,361 B1 | * | 1/2001 | Sailors | 296/50 |
| 6,206,444 B1 | * | 3/2001 | Casey | 296/50 |
| 6,517,140 B2 | * | 2/2003 | Wilde | 296/180.1 |
| 6,712,423 B2 | * | 3/2004 | Lehmann | 296/180.1 |
| 6,729,680 B2 | * | 5/2004 | Lehmann | 296/180.1 |
| 6,962,388 B1 | * | 11/2005 | Flores | 296/180.1 |
| 7,090,287 B1 | * | 8/2006 | Eberst | 296/180.1 |
| 7,108,314 B2 | * | 9/2006 | Lehmann | 296/180.1 |
| 7,182,395 B2 | * | 2/2007 | Lehmann | 296/180.1 |
| 7,874,610 B2 | * | 1/2011 | Khalighi | 296/180.1 |
| 2002/0053813 A1 | * | 5/2002 | Wilde | 296/180.1 |
| 2002/0163222 A1 | * | 11/2002 | Lehmann | 296/180.1 |
| 2002/0163223 A1 | * | 11/2002 | Lehmann | 296/180.1 |
| 2005/0264034 A1 | * | 12/2005 | Flores | 296/180.1 |

\* cited by examiner

*Primary Examiner* — Kiran B Patel
(74) *Attorney, Agent, or Firm* — Schmeiser, Olsen & Watts LLP

(57) ABSTRACT

A spoiler for use in a bed of a truck, said spoiler comprising: at least one deflection surface coupled to the bed of the truck; at least one support coupled to the at least one deflection surface; at least one attachment device coupled to the at least one support, wherein the at least one attachment device couples the at least one support to the bed of the truck; and at least one activator coupled to the spoiler. Alternate embodiments of the spoiler may comprise the at least one deflection surface being hingedly coupled to the bed of the truck. Further embodiments of the present invention may comprise the at least one attachment device removably coupling the at least one support to the bed of the truck.

12 Claims, 5 Drawing Sheets

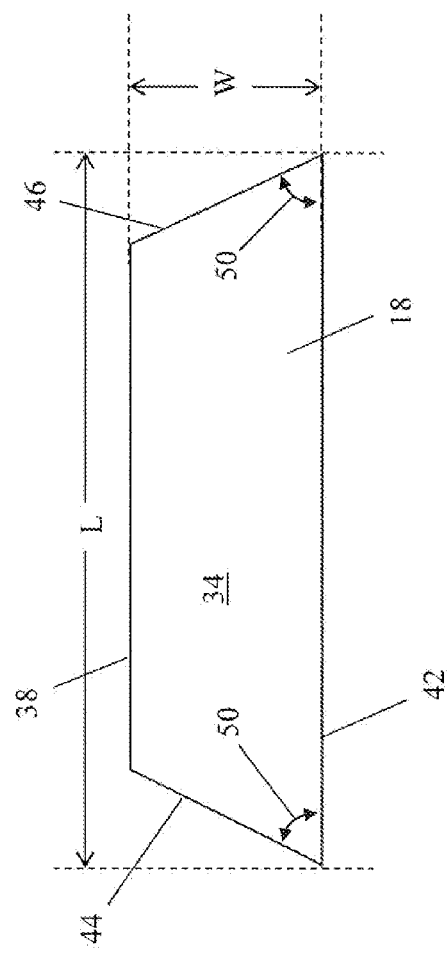
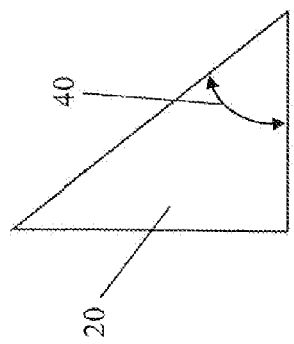

INBED TRUCK SPOILER

CROSS REFERENCE TO RELATED APPLICATIONS

This application in a continuation-in-part of U.S. patent application Ser. No. 11/423,362, filed Jun. 9, 2006, by Robert Stephen Nelson and entitled "INBED TRUCK SPOILER", which is incorporated herein by reference in its entirety. U.S. patent application Ser. No. 11/423,362 claims priority to U.S. Provisional Patent Application Ser. No. 60/693,478, filed Jun. 24, 2005, by Robert Stephen Nelson and entitled "IN-BED SPOILER", which is incorporated herein by reference in its entirety.

BACKGROUND OF THE INVENTION

1. Technical Field

This invention relates to an inbed truck spoiler for reducing drag in pickup trucks.

2. State of the Art

Sales of the largest pickup trucks have been soaring for several years in the United States. This has led to Japanese automakers rushing into the market, now one of the most profitable parts of the business and always dominated by the Big Three U.S. car makers. Once utilitarian vehicles used exclusively for work, pickup trucks are getting bigger, roomier, more powerful and showier in almost every way. Passenger cabs with two rows of seats, a minority a decade ago, are now the norm. The biggest pickups, which made up just 8.6 percent of new vehicles in the United States in 1990, now account for 13.2 percent. Sales of compact pickups have shrunk to less than 5 percent of the market. The allure of the pickup market for the auto industry is clear: The industry sold two to two-and-a-half times as many full-size pickups as it did full-size SUV's last year. Last year, Ford's F-Series pickup, the best-selling vehicle of any kind in the United States, contributed $2.4 billion of net income to Ford Motor. Toyota Motor is the only car maker based outside the United States that sells a full-size pickup, the Tundra, in the U.S. market. When sales were booming in 2001, it sold more than 100,000 Tundras, compared with Ford's sales of more than 900,000 F-Series trucks. General Motors sold more than 700,000 Chevrolet Silverados, the second-best-selling vehicle in the country, and more than 200,000 GMC Sierras, while Dodge, a brand of DaimlerChrysler, sold close to 350,000 Ram pickups. This year, GM started selling a luxury pickup with a convertible top, the Chevrolet SSR, which starts above $40,000. Nissan Motor introduced its first full-size pickup, the voluminous Titan, last year. Although pickup trucks have experienced a large upsurge in popularity, a major drawback to owning a pickup truck is the fuel efficiency. The fuel efficiency of the average pickup has fallen from as high as 19.2 miles a gallon in the 1987 model year to 16.8 miles a gallon in 2004 (an average car gets 24.8).

Currently there are several patents offering inventions that attempt to solve the fuel efficiency problems of the average pickup trucks. Several U.S. patents, i.e. U.S. Pat. No. 4,159,843 and U.S. Pat. No. 6,637,806, describe spoilers which attach to the cab of a pickup truck in order to reduce drag on the vehicle and increase the fuel efficiency of the truck. These spoilers, however, alter the look of the truck significantly. They are also permanently attached to the vehicle and therefore cannot be removed by the truck owner without damaging the truck.

U.S. Pat. No. 4,585,263 describes a spoiler which fits into the bed of the pickup truck up against the tailgate in an attempt to direct airflow out of the truck bed thereby reducing the drag on the tailgate and increasing the fuel efficiency. This spoiler, however, must be placed firmly up against the tailgate of the truck and therefore does not allow for alteration of the position of the spoiler in case of cargo that must be in a certain position in the truck bed. Though, removable, this spoiler also does not collapse in order to allow large cargo to be placed in the truck bed. Instead, the spoiler must be removed from the vehicle and then reinstalled once the cargo has been removed. Further, the spoiler disclosed in the U.S. Pat. No. 4,585,263 application also does not allow for automatic alteration of the angle of the spoiler.

Accordingly, what is needed is a spoiler for a pickup truck which increases the fuel efficiency of the truck without altering the appearance of the vehicle and which collapses in order to allow large cargo to be placed in the truck without the necessity of removing and then reinstalling the spoiler. A spoiler that can be automatically adjusted is also desirable for ease of use.

DISCLOSURE OF THE INVENTION

The present invention may be readily adapted to a variety of pickup trucks. Embodiments of the present invention may provide, among other benefits: a spoiler which increases the fuel efficiency of a pickup truck without altering the appearance of the vehicle and which collapses in order to allow large cargo to be carried in the vehicle without the necessity of removing the spoiler. Embodiments of the present invention also provide a spoiler which can be raised and lowered automatically.

In particular embodiments, spoilers are described that comprise at least one deflection surface; at least one support coupled to the at least one deflection surface; at least one attachment device coupled to the at least one support, wherein the at least one attachment device couples the at least one support to the bed of the truck; and at least one activator coupled to the spoiler.

Disclosed is a spoiler for use in a truck. The spoiler includes a deflection surface, at least one support coupled to the deflection surface, and at least one attachment device coupled to the at least one support, wherein the at least one attachment device couples the at least one support to a bed of the truck. The spoiler is located a distance from a tailgate of the truck when the tailgate is in a closed position, where the distance is large enough such that groceries can be placed between the spoiler and the tailgate when the tailgate is in the closed position. In some embodiments the distance is at least 2 inches. In some embodiments the distance is at least 11 inches. In some embodiments the deflection surface is coupled to the support such that the deflection surface forms a tilt angle of between 20 and 25 degrees between the bed of the truck and the deflection surface. In some embodiments the deflection surface is coupled to the support such that the deflection surface forms a tilt angle of between 23 and 24 degrees between the bed of the truck and the deflection surface. In some embodiments the deflection surface is coupled to the support such that the deflection surface forms a tilt angle of 23.75 degrees between the bed of the truck and the deflection surface.

In some embodiments the deflection surface comprises a plate of rigid material comprising a width and a length, wherein the width is between 12 inches and 19 inches. In some embodiments the width is 18 inches. In some embodiments the length is between 48 inches and 66 inches. In some embodiments the length is between 54 inches and 63 inches.

In some embodiments the deflection surface further includes a front surface, a rear surface, a top edge, a bottom edge, a first side edge and a second side edge. In some embodiments a side angle between the bottom edge and the first side edge is between 70 degrees and 90 degrees. In some embodiments the side angle between the bottom edge and the first side edge is between 72 degrees and 74 degrees. In some embodiments the side angle between the bottom edge and the first side edge is 73 degrees. In some embodiments a side angle between the bottom edge and the second side edge is between 70 degrees and 90 degrees. In some embodiments the side angle between the bottom edge and the second side edge is between 72 degrees and 74 degrees. In some embodiments the side angle between the bottom edge and the second side edge is 73 degrees.

Disclosed is a spoiler for use on a bed of a pickup truck, the spoiler comprising a deflection surface coupled to the bed of the pickup truck, wherein the spoiler is coupled to the bed such that there is a tilt angle of between 23 and 24 degrees between the deflection surface and the bed of the pickup truck. The deflection surface comprises a top edge, where the distance between the top edge and a tailgate of the pickup truck is between 10 and 13 inches, a bottom edge, where the bottom edge is coupled to the bed of the pickup truck, a first side edge, wherein an angle between the first side edge and the bottom edge is between 72 and 73 degrees, and a second side edge, wherein an angle between the second side edge and the bottom edge is between 72 and 73 degrees.

Disclosed is a method of increasing the fuel efficiency of a pickup truck, the method comprising the step of coupling a deflection surface to a bed of the pickup truck, where the deflection surface comprises a front surface, a rear surface, a top edge, a bottom edge, a first side edge, and a second side edge. The method of increasing the fuel efficiency of a pickup truck according to the invention also includes the step of applying pressure to the rear surface with an air flow, in response to the air flow travelling over the cab of the pickup truck, in between the top edge and a tailgate of the pickup truck, and impinging on the rear surface, while the pickup truck is moving in a forward direction. In some embodiments the air flow travels from the rear surface towards the cab, a first portion of the air flow travelling between the first side edge and a first side of the pickup truck, and a second portion of the air flow travelling between the second side edge and a second side of the pickup truck. This allows the air to flow into the dead air space of the pickup bed 14.

In some embodiments coupling a deflection surface to a bed of the pickup truck comprises coupling a deflection surface to a bed of the pickup truck such that a tilt angle between the deflection surface and the bed of the pickup truck is between 23 and 24 degrees. In some embodiments the top edge is a distance of between 11 and 12 inches from the tailgate when the tailgate is in a closed position. In some embodiments the top edge is a distance of greater than 2 inches from the tailgate when the tailgate is in a closed position. In some embodiments an angle between the bottom edge and the first side edge is between 72 and 74 degrees. In some embodiments an angle between the bottom edge and the second side edge is between 72 and 74 degrees.

Disclosed is a method of coupling a spoiler to a bed of a pickup truck. The method includes the step of laying a deflection surface flat on the bed of the pickup truck such that a top edge of the deflection surface is towards a tailgate of the pickup truck and one inch away from the tailgate of the pickup truck, a bottom edge of the deflection surface is towards a cab of the pickup truck, and the distance between a first side of the pickup truck and a first edge of the deflection surface is the same as the distance between a second side of the pickup truck and a second edge of the deflection surface. The method of coupling a spoiler to a bed of a pickup truck includes the step of coupling a spoiler hinge to the bed of the pickup truck. The method of coupling a spoiler to a bed of a pickup truck includes the step of coupling the bottom edge of the deflection surface to the spoiler hinge. The method of coupling a spoiler to a bed of a pickup truck also include the step of raising the top edge of the deflection surface, and coupling a support in between the deflection surface and the bed of the pickup truck such that the deflection surface forms a tilt angle of between 23 and 24 degrees between the deflection surface and the bed of the pickup truck. In some embodiments the distance between the top edge of the deflection surface and the tailgate of the pickup truck is greater than 2 inches. In some embodiments the distance between the top edge of the deflection surface and the tailgate of the pickup truck is greater than 11 inches.

The foregoing and other features and advantages of the invention will be apparent to those of ordinary skill in the art from the following more particular description of the invention and the accompanying drawings.

BRIEF DESCRIPTION OF THE DRAWINGS

FIG. 3 is a front view of deflection surface 18 of spoiler 10 of FIG. 1.

FIG. 4 is a side view of support 20 of spoiler 10 of FIG. 1.

DETAILED DESCRIPTION OF EMBODIMENTS OF THE INVENTION

As discussed above, embodiments of the invention relate to an inbed spoiler for pickup trucks. Generally, a spoiler configured according to embodiments of the invention comprises at least one deflection surface; at least one support coupled to the at least one deflection surface; at least one attachment device coupled to the at least one support, wherein the at least one attachment device couples the at least one support to the bed of the truck. In some embodiments at least one activator is coupled to the spoiler.

Figure 1:
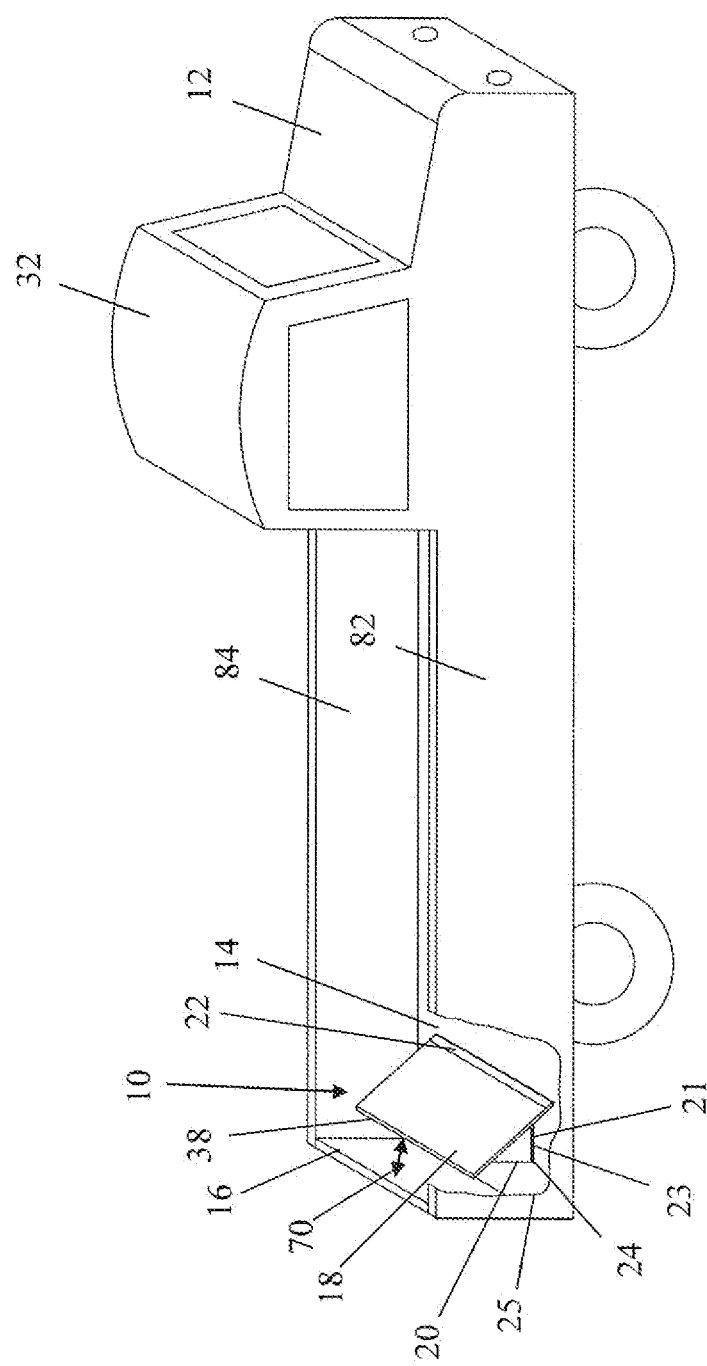
FIG. 1 is an isometric view of pickup truck 12 with spoiler 10 according to the invention.
Figures 2A, 2B:
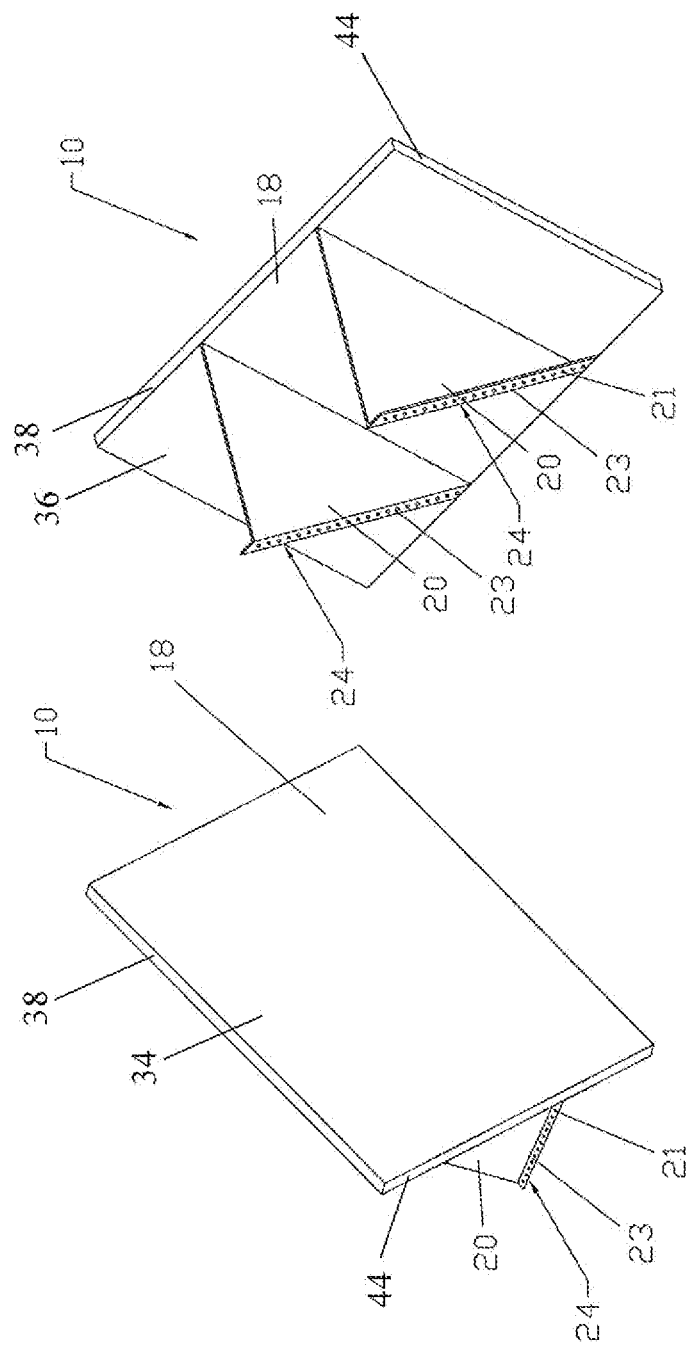
FIG. 2A is an isometric top view of spoiler 10 of FIG. 1.
FIG. 2B is an isometric bottom view of spoiler 10 of FIG. 1.
Figure 5:
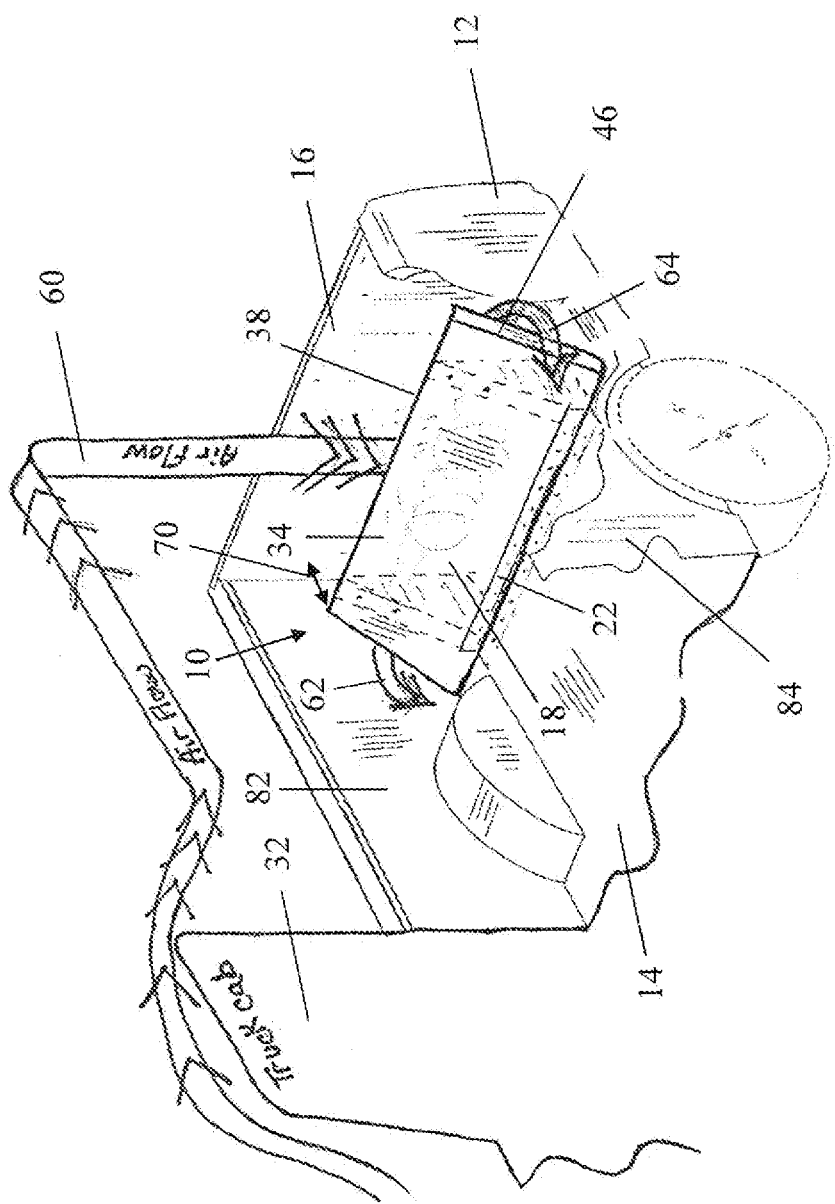
FIG. 5 is a partially cutaway perspective view of pickup truck 12 with spoiler 10 of FIG. 1, showing how air flow 60 travels over cab 32 of pickup truck 12, between top edge 38 of deflection surface 18 and tailgate 16, impinges on rear surface 36 (FIG. 6) and compresses and divides into air flow first portion 62 and air flow second portion 64.
Figure 6:
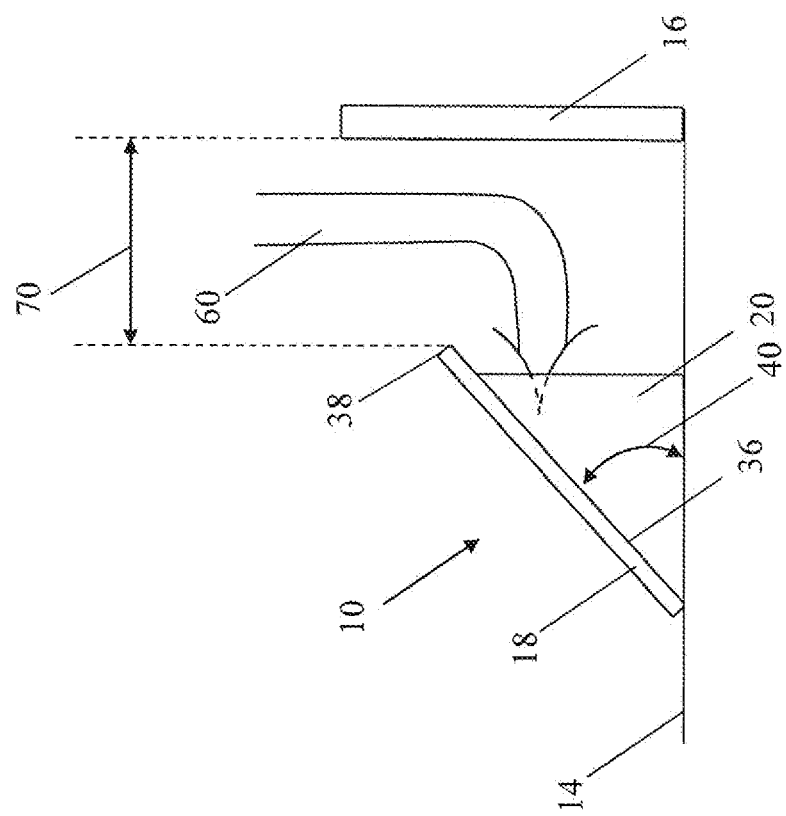
FIG. 6 shows a side cross-section view of spoiler 10 of FIG. 1 and FIG. 5 mounted in pickup truck 12, showing how deflection surface 18 forms tilt angle 40 between deflection surface 18 and bed 14 of pickup truck 12, and how column of air 60 travels between top edge 38 of deflection surface 18 and tailgate 16 to impinge on rear surface 36 of deflection surface 18.

FIG. 1 illustrates a pickup truck 12 with a spoiler 10 according to the invention installed on bed 14 of pickup truck 12. A tailgate 16 of pickup truck 12 is also depicted in FIG. 1. The sidewall of the pickup truck 12 is cut away at line 25 in order to show the spoiler 10 on bed 14 of pickup truck 12. FIG. 2A and FIG. 2B show perspective views of spoiler 10 of FIG. 1. FIG. 3 shows a front view of deflection surface 18 of spoiler 10 of FIG. 1. FIG. 4 shows a side view of support 20 of spoiler 10 of FIG. 1. FIG. 5 shows a cutaway perspective view of spoiler 10 and pickup truck 12 of FIG. 1. FIG. 6 shows a side view cross-section of spoiler 10 of FIG. 1 and FIG. 5 on truck bed 14 of pickup truck 12.

As illustrated in FIG. 1 though FIG. 6, spoiler 10 according to the invention comprises at least one deflection surface 18. The at least one deflection surface 18 may be a thin rectangular member. In this embodiment deflection surface 18 is a plate of rigid material as shown in FIG. 3. The largest surface of the at least one deflection surface 18 should be positioned in order to guide the air flowing over the bed 14 of the pickup truck 12 in front of the tailgate 16. The at least one deflection surface 18 may be a smooth surface which allows the air flowing over the bed 14 of the pickup truck 12 to flow smoothly in front of tailgate 16.

The at least one deflection surface 18 may be formed in any shape or of any material that allows the at least one deflection surface 18 to serve its purpose. The at least one deflection surface 18 should be formed from a rigid or semi-rigid material that may easily be shaped and will hold its shape. The at least one deflection surface 18 should be formed of a material that is able to withstand the force created by the air flowing over the bed 14 of the pickup truck 12 hitting the at least one deflection surface 18. In embodiments of the invention, aluminum diamond plate may be used to form the at least one deflection surface 18 in order to add aesthetic appeal to the spoiler 10.

In additional embodiments of the present invention, the at least one deflection surface 18 is simply created in standard sizes in order to fit the standard size truck beds. This may relieve the user of the need to alter the width of the at least one deflection surface 18.

The at least one deflection surface 18 is coupled to at least one support 20. The at least one support 20 holds the at least one deflection surface 18 at a tilt angle 40 (see FIG. 6) that allows the air flowing over the bed 14 of truck and down in between the spoiler 10 and tailgate 16 to impinge on surface 36. Air flowing into the space between the tailgate 16 and spoiler 10 becomes compressed. The air is directed to flow out of the sides 62 and 64 into the bed 14 pushing the truck forward as shown in FIG. 5. The at least one support 20 may be formed in any shape that will provide the support needed to secure the at least one deflection surface 18.

In embodiments of the present invention, the at least one support 20 may be formed as a right triangle with the hypotenuse of the triangle being coupled to the at least one deflection surface 18 and one of the short sides of the triangle being coupled to the bed 14 of the truck 12, as shown in FIG. 1, FIG. 5, and FIG. 6. Multiple at least one supports 20 may be coupled to the at least one deflection surface 18 in order to support the surface at tilt angle 40. Tilt angle 40 is the angle between deflection surface 18 and bed 14 of pickup truck 12. Deflection surface 18 is coupled to support 20 such that deflection surface 18 forms tilt angle 40 between bed 14 of pickup truck 12 and deflection surface 18, see FIG. 1, FIG. 5, and FIG. 6. In some embodiments tilt angle 40 is between 20 and 25 degrees. In some embodiments tilt angle 40 is between 23 and 24 degrees. In some embodiments tilt angle 40 is 23.75 degrees. A tilt angle of 23.75 degrees has been found to optimize fuel efficiency of the pickup truck, and allow deflection surface 18 to capture air flow 60 on rear surface 36 of deflection surface 18 after air flow 60 travels over cab 32, in between top edge 38 of deflection surface 18 and tailgate 16, and impinges on rear surface 36 (see FIG. 5 and FIG. 6).

The at least one support 20 may be formed from any material which is strong enough to support the at least one deflection surface 18 at tilt angle 40, and withstand the jostling of the truck 12 in motion.

The at least one support 20 may be coupled to the at least one deflection surface 18 in any way that provides enough strength to secure the at least one support 20 to the at least one deflection surface 18. The at least one support 20 may be coupled to the at least one deflection surface 18 using screws, nails, adhesives, hinges or any other coupling device. The at least one support 20 and the at least one deflection surface 18 may also be formed in one piece.

The at least one support 20 is coupled to bed 14 of truck 12 with an attachment device 24. The attachment device 24 may be any device that couples the at least one support 20 to the bed 14 with the strength to maintain the spoiler 10 in position when the truck 12 is in motion. It may be preferable to use an attachment device 24 such as magnets that does not damage the bed 14 of the truck 12 and which are easily removable. In alternate embodiments of the present invention, the attachment device 24 consists of a portion of the at least one support 20 which bends at a 90 degree angle forming a dog ear 23 (FIG. 2B) which is screwed down to the bed 14 that runs perpendicular to the at least one support 20 and parallel to the truck 12 bed 14. The dog ear 23 is then bolted or screwed 21 to the truck 12 bed 14. A typical dog ear 23 configured according to embodiments of the present invention may be approximately 1 inch in length. Attachment devices 24 may include but are not limited to, screws, bolts, magnets, adhesives, hinges and the like.

Spoilers 10 configured according to the invention may be collapsible so that cargo such as ATVs and the like may be placed in the bed 14 of the truck 12. Collapsible spoilers 10 may comprise the at least one deflection surface 18 being hingedly coupled 22 to the bed 14 of the truck 12. A typical hingedly coupling 22 configured according to embodiments of the present invention may comprise a hinge which is 4 feet long which is attached to the at least one deflection surface 18 bottom edge 42 and to bed 14 by approximately twenty 5/16 hex head bolts. The at least one support 20 may be removably or hingedly coupled to the at least one deflection surface 18. When the user wants to collapse the spoiler 10, the user uncouples both of the supports 20 from the bed 14 of the truck 12. The user then uncouples both of the supports 20 from the at least one deflection surface 18 or if the at least one support 20 is hingedly coupled to the at least one deflection surface 18, the user removes support 20 from surface 18. The user then rotates the at least one deflection surface 18 and if hingedly connected the at least one support 20, flat against the bed 14 of the truck 12. Cargo may then be placed on top of the spoiler 10.

As illustrated in FIG. 1, spoilers 10 according to the invention are placed on bed 14 of truck 12. In particular, spoilers 10 are placed at a distance 70 from tailgate 16 when tailgate 16 is in a closed or vertical position. Spoiler 10 is positioned on bed 14 such that top edge 38 is a distance 70 from tailgate 16 of truck 12 when tailgate 16 is in a closed position as shown in FIG. 1, FIG. 5, and FIG. 6. This allows smaller cargo such as groceries and the like to be placed between spoiler 10 and tailgate 16 when tailgate 16 is closed. Cargo may be held in place by spoiler 10 and kept from moving about the bed 14 of the truck 12.

Distance 70 between spoiler 10 and tailgate 16 is important in providing maximum fuel efficiency of pickup truck 12. Distance 70 allows a flow of air 60 to travel over cab 32 of truck 12 as truck 12 is moving forward. Air flow 60 passes between top edge 38 of deflection surface 18 and tailgate 16, and impinges on rear surface 36 of deflection surface 18, as shown in FIG. 5 and FIG. 6. Air flow 60 impinging on rear surface 36 of deflection surface 18 applies pressure to rear surface 36 with air flow 60. The pressure of air flow 60 on rear surface 36 helps to increase the fuel efficiency of truck 12. After air flow 60 impinges of rear surface 36, air flow 60 divides into first portion if air flow 62 and second portion of air flow 64. First portion of air flow 62 passes between first side 82 of pickup truck 12 and first side edge 44 (FIG. 3) of deflection surface 18. Second portion of air flow 64 passes between second side 84 of pickup truck 12 and second side edge 46 of deflection surface 18.

The fuel efficiency of truck 12 is optimized when air flow 60 is optimized. Air flow 60 is optimized when the height and width of deflection surface 18 is chosen to optimize fuel efficiency, and side angles 50 (FIG. 3) between first and second side edges 44 and 46 and bottom edge 42 of deflection surface 18 are chosen for optimum fuel efficiency.

Deflection surface 18 of FIG. 1. FIG. 5, and FIG. 6 has length L and width W, as shown in FIG. 3. Deflection surface 18 also has top edge 38, bottom edge 42, first and second side edges 44 and 46, front surface 34, and rear surface 36. In this embodiment deflection surface 18 is a rectilinear plate of rigid material. The geometry and placement of spoiler 10 on bed 14 optimizes the fuel efficiency of truck 12. As discussed earlier, deflection surface 18 is coupled to bed 14 using support 20 such that deflection surface 18 forms tilt angle 40 between deflection surface 18 and bed 14. In some embodiments tilt angle 40 is between 20 and 25 degrees. In some embodiments tilt angle 40 is between 23 and 24 degrees. In some embodiments tilt angle 40 is 23.75 degrees. Some pickup truck configurations may require tilt angles to be other values, but testing by the inventor has shown that a tilt angle of 23.75 degrees, or near that value, optimizes fuel efficiency.

In the embodiment shown in FIG. 1, FIG. 3, and FIG. 6, deflection surface 18 has a length L of between 54 and 63 inches. In some embodiments the length L is between 48 and 66 inches. In some embodiments of mid-sized pickup trucks, length L is 4 feet 7 inches. In some embodiments of full size pickup trucks, length L is 5 feet 2 inches. These values for length L of deflection surface 18 have been shown to maximize the fuel efficiency of truck 12.

In the embodiment shown in FIG. 1, FIG. 3, and FIG. 6, deflection surface 18 has a width W of between 8 and 24 inches. In some embodiments the width W is between 12 and 19 inches. In some embodiments of mid-sized pickup trucks, width W is 1 foot 1 inches. In some embodiments of full size pickup trucks, width W is 1 foot 6 inches. These values for width W of deflection surface 18 have been shown to maximize the fuel efficiency of truck 12.

In the embodiment shown in FIG. 1, FIG. 3, and FIG. 6, deflection surface 18 has two side angles 50, a first side angle 50 between first side edge 44 and bottom 42, and a second side angle 50 between second side edge 46 and bottom 42. In this embodiment side angles 50 are 73 degrees. In some embodiments side angels 50 are between 72 degrees and 74 degrees. These values for side angles 50 of deflection surface 18 have been shown to maximize the fuel efficiency of truck 12.

In the embodiment shown in FIG. 1, FIG. 5, and FIG. 6, deflection surface 18 is positioned on truck bed 14 such that there is a distance 70 between spoiler 10 and tailgate 16. In this embodiment, distance 70 is between top edge 38 of deflection surface 18 and tailgate 16 of truck 12. In this embodiment distance 70 is 11 and ⅛ inches. In some embodiments distance 70 is 12 inches. These distances have been shown to maximize the fuel efficiency of particular models of pickup trucks. For other specific pickup trucks distance 70 may be other values. In some embodiments, distance 70 is at least 2 inches. In some embodiments, distance 70 is at least 11 inches. These values for distance 70 between deflection surface 18 and tailgate 16 have been shown to maximize the fuel efficiency of truck 12.

The disclosed invention includes a method of increasing the fuel efficiency of a pickup truck, the method comprising the step of coupling a deflection surface to a bed of the pickup truck, where the deflection surface comprises a front surface, a rear surface, a top edge, a bottom edge, a first side edge, and a second side edge. The method of increasing the fuel efficiency of a pickup truck according to the invention also includes the step of applying pressure to the rear surface with an air flow, in response to the air flow travelling over the cab of the pickup truck, in between the top edge and a tailgate of the pickup truck, and impinging on the rear surface, while the pickup truck is moving in a forward direction. In some embodiments the air flow travels from the rear surface towards the cab, a first portion of the air flow travelling between the first side edge and a first side of the pickup truck, and a second portion of the air flow travelling between the second side edge and a second side of the pickup truck flowing into the air space 14 of the truck bed forward of the deflection surface.

In some embodiments coupling a deflection surface to a bed of the pickup truck comprises coupling a deflection surface to a bed of the pickup truck such that a tilt angle between the deflection surface and the bed of the pickup truck is between 23 and 24 degrees. In some embodiments the top edge is a distance of between 11 and 12 inches from the tailgate when the tailgate is in a closed position. In some embodiments the top edge is a distance of greater than 2 inches from the tailgate when the tailgate is in a closed position. In some embodiments an angle between the bottom edge and the second side edge is between 72 and 74 degrees.

The disclosed invention includes a method of coupling a spoiler to a bed of a pickup truck. The method includes the step of laying a deflection surface flat on the bed of the pickup truck such that a top edge of the deflection surface is towards a tailgate of the pickup truck and one inch away from the tailgate of the pickup truck, a bottom edge of the deflection surface is towards a cab of the pickup truck, and the distance between a first side of the pickup truck and a first edge of the deflection surface is the same as the distance between a second side of the pickup truck and a second edge of the deflection surface. The method of coupling a spoiler to a bed of a pickup truck includes the step of coupling a spoiler hinge to the bed of the pickup truck. The method of coupling a spoiler to a bed of a pickup truck includes the step of coupling the bottom edge of the deflection surface to the spoiler hinge. The method of coupling a spoiler to a bed of a pickup truck also include the step of raising the top edge of the deflection surface, and coupling a support in between the deflection surface and the bed of the pickup truck such that the deflection surface forms a tilt angle of between 23 and 24 degrees between the deflection surface and the bed of the pickup truck. In some embodiments the distance between the top edge of the deflection surface and the tailgate of the pickup truck is greater than 2 inches. In some embodiments the distance between the top edge of the deflection surface and the tailgate of the pickup truck is greater than 11 inches.

Accordingly, for the exemplary purposes of this disclosure, the components defining any embodiment of the invention may be formed as one piece if it is possible for the components to still serve their function. The components may also be composed of any of many different types of materials or combinations thereof that can readily be formed into shaped objects provided that the components selected are consistent with the intended mechanical operation of the invention. For example, the components may be formed of rubbers (synthetic and/or natural), glasses, composites such as fiberglass, carbon-fiber and/or other like materials, polymers such as plastic, polycarbonate, PVC plastic, ABS plastic, polystyrene, polypropylene, acrylic, nylon, phenolic, any combination thereof, and/or other like materials, metals, such as zinc, magnesium, titanium, copper, iron, steel, stainless steel, any combination thereof, and/or other like materials, alloys, such as aluminum, and/or other like materials, any other suitable material, and/or any combination thereof.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A spoiler for use in a truck, the spoiler comprising:
   a deflection surface, wherein the deflection surface has a top edge;
   at least one support coupled to the deflection surface; and
   at least one attachment device coupled to the at least one support, wherein the at least one attachment device couples the at least one support to a bed of the truck;
   wherein the top edge of the deflection surface is located a distance from a tailgate of the truck, and wherein the distance is large enough such that groceries can be placed between the top edge and the tailgate when the tailgate is in the closed position.

2. The spoiler of claim 1, wherein the distance is at least 2 inches.

3. The spoiler of claim 1, wherein the distance is at least 11 inches.

4. The spoiler of claim 1, wherein the deflection surface is coupled to the support such that the deflection surface forms a tilt angle of between 20 and 25 degrees between the bed of the truck and the deflection surface.

5. The spoiler of claim 1, wherein the deflection surface is coupled to the support such that the deflection surface forms a tilt angle of between 23 and 24 degrees between the bed of the truck and the deflection surface.

6. The spoiler of claim 1, wherein the deflection surface is coupled to the support such that the deflection surface forms a tilt angle of 23.75 degrees between the bed of the truck and the deflection surface.

7. The spoiler of claim 1, wherein the deflection surface comprises a plate of rigid material comprising a width and a length, wherein the width is between 12 inches and 19 inches.

8. The spoiler of claim 7, wherein the width is 18 inches.

9. The spoiler of claim 7, wherein the length is between 48 inches and 66 inches.

10. The spoiler of claim 7, wherein the length is between 54 inches and 63 inches.

11. The spoiler of claim 1, wherein the deflection surface is configured to direct an air flow over the bed of the truck and down in between the top edge and the tailgate of the truck.

12. The spoiler of claim 11, wherein the air flow that is directed between the top edge and the tailgate impinges on a rear surface of the deflection surface, and wherein the air flow travels from the rear surface towards a cab of the truck, a first portion of the air flow travelling between a first side edge of the deflection surface and a first side of the truck, and a second portion of the air flow travelling between a second side edge of the deflection surface and a second side of the truck.

* * * * *